J. Z. WALKER.
Insect-Exterminator.
No. 216,476.  Patented June 10, 1879.
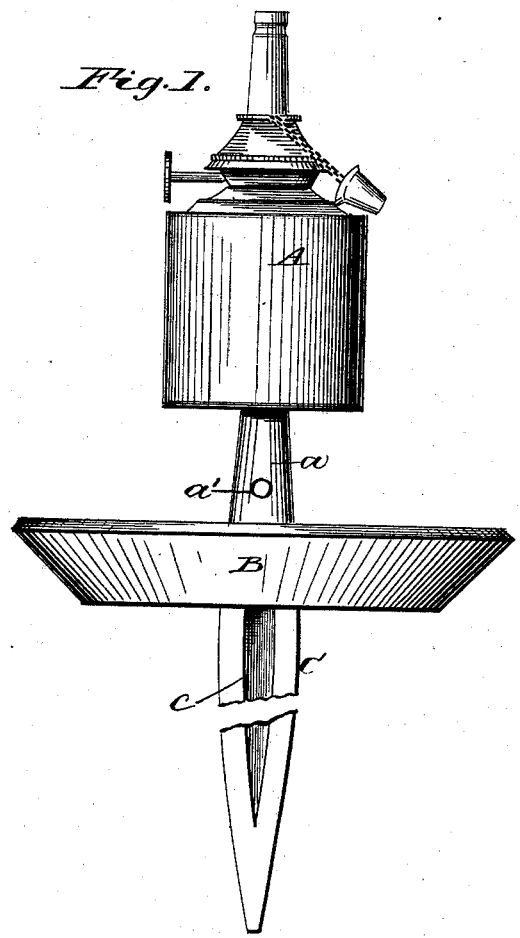
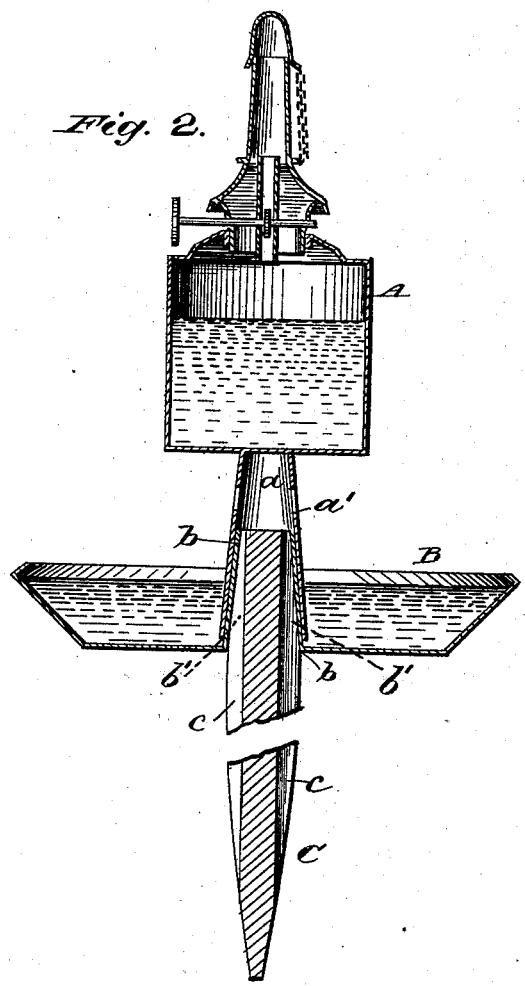
Witnesses:
Fred G. Dieterich
George Binkenburg
Inventor
John Z. Walker
by Louis Baggers
his Attorneys.

UNITED STATES PATENT OFFICE.

JOHN Z. WALKER, OF WINCHESTER, TEXAS.

IMPROVEMENT IN INSECT-EXTERMINATORS.

Specification forming part of Letters Patent No. 216,476, dated June 10, 1879; application filed December 7, 1878.

*To all whom it may concern:*

Be it known that I, JOHN Z. WALKER, of Winchester, in the county of Fayette and State of Texas, have invented certain new and useful Improvements in Insect-Exterminators; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved insect-exterminator, and Fig. 2 is a vertical section thereof.

The same part in the two figures is denoted by the same letter.

This invention has reference to that class of insect-exterminators in which the insect is attracted by a lighted lamp, and, becoming maimed or helpless from the effects of the heat of the flame, falls into a liquid in a receptacle or vessel placed below; and it consists in a grooved support, in combination with a perforated socket of the usual lamp and basin of this class of exterminators, whereby larvæ and other destructive insects not winged can, attracted by the light of the lamp, gain access to the basin or vessel placed below, substantially as hereinafter more fully set forth.

In the annexed drawings, A represents a lamp, of any suitable construction, and of sufficient capacity, say, to hold a quart or more of oil, the first-named quantity being sufficient to keep the lamp burning throughout the night, by whose light it is designed to attract the insect, especially the moths and millers of the cotton-fly in cotton-fields. The lamp A is provided with a tubular pendant, $a$, which may be of any desirable length, and is provided with one or more perforations, $a'$, the object of which will be perceived hereinafter.

B is a receptacle or vessel, preferably after the pan form, for holding a viscid liquid or substance, into which the insect is designed to fall when maimed or rendered helpless by the effects of the heat of the light, or rather its flame, and thus put an end to or exterminate the insect or insects falling therein. This pan or receptacle is provided with a central tapering tube, $b$, opening through its bottom, for the reception of the upper end of an elevating-staff, C, upon which it is intended to support the whole device a slight distance or just above the top of the cotton. This support is grooved or fluted longitudinally, as shown at $c$.

Upon the tube $b$ is inserted the tube $a$ of the lamp A, to support the same detachably thereon, an open space being formed by the ribs of the fluted support between this and the tube $b$, as shown at $b'$ in Fig. 2, which leads up to the perforation or perforations $a'$ in the socket $a$.

This invention is valuable, especially in cotton-fields, for their protection from the ravages of the insects that infect those localities, inasmuch as it does not only protect the plants from winged insects, but larvæ upon the ground, or such of the bushes as are in contact with the support C, will, attracted by the light, creep up the support, the grooves $c$ admitting them into the hollow socket $a$, where the only outlet is through the openings $a'$ down into the water or other fluid placed in the pan below.

Having thus fully described my invention, I claim and desire to secure by Letters Patent of the United States—

The insect-exterminator herein described, consisting of the lamp or lantern A, having tubular socket $a$, provided with perforations $a'$, in combination with the pan or receptacle B, having tubular post $b$, and support C, having longitudinal grooves $c$, substantially as and for the purpose set forth.

In testimony that I claim the foregoing as my own I have hereunto affixed my signature in presence of two witnesses.

JOHN Z. WALKER.

Witnesses:
  G. C. THOMAS,
  J. ROENSCH.